US012594962B2

(12) United States Patent
Urano et al.

(10) Patent No.: US 12,594,962 B2
(45) Date of Patent: Apr. 7, 2026

(54) AUTONOMOUS DRIVING SYSTEM

(71) Applicant: TOYOTA JIDOSHA KABUSHIKI KAISHA, Toyota (JP)

(72) Inventors: Hiromitsu Urano, Numazu (JP); Masamichi Ohsugi, Sunto-gun Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 18/761,875

(22) Filed: Jul. 2, 2024

(65) Prior Publication Data

US 2025/0018977 A1    Jan. 16, 2025

(30) Foreign Application Priority Data

Jul. 10, 2023    (JP) ................................. 2023-113256

(51) Int. Cl.
  B60W 60/00          (2020.01)
(52) U.S. Cl.
  CPC ............................... B60W 60/0011 (2020.02)
(58) Field of Classification Search
  CPC ........... B60W 60/0011; G01C 21/3453; G07C 5/0841
  See application file for complete search history.

(56) References Cited

U.S. PATENT DOCUMENTS

| | | | |
|---|---|---|---|
| 2017/0030728 A1* | 2/2017 | Baglino | ............. G01C 21/3469 |
| 2018/0189323 A1* | 7/2018 | Wheeler | ............. G06F 12/0811 |
| 2020/0026435 A1 | 1/2020 | Satou et al. | |
| 2020/0302233 A1 | 9/2020 | Iwasaki | |
| 2021/0089026 A1* | 3/2021 | Bender | ............... H04W 72/542 |
| 2022/0230021 A1* | 7/2022 | Muehlenstaedt | .... G06V 10/764 |
| 2023/0119474 A1 | 4/2023 | Yamaoka et al. | |
| 2024/0351606 A1* | 10/2024 | Hormasji | ............... G07C 5/085 |

FOREIGN PATENT DOCUMENTS

| | | |
|---|---|---|
| JP | 2011-113494 A | 6/2011 |
| JP | 2019-056559 A | 4/2019 |
| JP | 6761002 B2 | 9/2020 |
| JP | 2021-146770 A | 9/2021 |
| WO | 2019/116423 A1 | 6/2019 |

* cited by examiner

*Primary Examiner* — Anne Marie Antonucci
*Assistant Examiner* — Wesam Almadhrhi
(74) *Attorney, Agent, or Firm* — Dinsmore & Shohl LLP

(57)          ABSTRACT

An autonomous driving route along which autonomous driving control of a vehicle is executed is set. In the setting of the autonomous driving route, at least two candidates of a route from a current location to a destination of the vehicle are set. Next, for each of the at least two candidates, a fluctuation amount of log data that fluctuates in a memory device during a travel of the vehicle along the candidate of the route. Next, a future value of a free space in the memory device at which the vehicle arrives at a destination of the candidate of the route for each of the at least two candidates based on the fluctuation amount of the log data. Then, one candidate of the route from the at least two candidates of which the future value of the free space is the maximum is selected as the autonomous driving route.

4 Claims, 6 Drawing Sheets

$$QC\_RTn(Tds)=QC(Tcl)-\int\Delta QA\_RTndt$$

AUTONOMOUS DRIVING SYSTEM

CROSS-REFERENCE TO RELATED APPLICATION

The present application claims priority under 35 U.S.C. § 119 to Japanese Patent Application No. 2023-113256, filed on Jul. 10, 2023, the contents of which application are incorporated herein by reference in their entirety.

TECHNICAL FIELD

The present disclosure relates to a system for autonomous driving control of a vehicle.

BACKGROUND

In recent years, the development of an autonomous driving technique for controlling a vehicle from data of sensors or the like mounted on the vehicle using models generated through a machine learning (machine learning models) has been advanced. WO2019/116423A proposes a method to collect training data for use in generating the machine learning models.

Examples of documents indicating a technical level of the art relevant to the present disclosure include JP2011113494A, JP2021146770A and JP6761002B, in addition to WO2019/116423A.

It is desirable that autonomous driving control of a vehicle executed using the machine learning models be verified later. As a method for enabling this verification, it is conceivable to store in a memory device of the vehicle log data related to the autonomous driving control of the vehicle. However, a capacity of the memory device of the vehicle is limited. Therefore, when the data quantity of the stored log data reaches a certain value or more, the stored log data may be transmitted to an outside of the vehicle and deleted from the memory device. However, during the execution of the autonomous driving control, log data related to the autonomous driving control is generated every moment. Therefore, when a free space of the memory device is filled with the log data before being transmitted to the outside and the log data generated during the autonomous driving control, the latter log data may not be stored from the middle of the autonomous driving control. Therefore, it is desired to develop a technique for avoiding such a tight situation.

An object of the present disclosure is to provide a technique that can prevent a situation in which the free space of the memory device of the vehicle in which the autonomous driving control using machine learning models is executed is filled with log data related to the autonomous driving control.

SUMMARY

The present disclosure is an autonomous driving system mounted on a vehicle and has the following features.

The autonomous driving system comprises one or more processing circuitries and one or more memory devices.

The one or more processing circuitries are configured to:

set an autonomous driving route indicating a route of the vehicle on which autonomous driving control of the vehicle is executed; and store log data related to the autonomous driving control in the one or more memory devices while the vehicle is traveling along the autonomous driving route.

In the setting of the autonomous driving route, the one or more processing circuitries are configured to:

set at least two candidates for a route from a current location of the vehicle to a destination of the vehicle;

predict for each of the at least two candidates of the route a fluctuation amount of the log data that fluctuates in the one or more memory devices during the travel of the vehicle along the candidate of the route;

predict a future value of a free space in the one or more memory devices at which the vehicle arrives at a destination of the candidate of the route for each of the at least two candidates of the route based on the fluctuation amount of the log data predicted for each of the at least two candidates of the route; and select as the autonomous driving route one candidate of the route from the at least two candidates of the route of which the future value of the free space is the maximum.

According to the present disclosure, the fluctuation amount of the log data that fluctuates in the one or more memory devices during the travel of the vehicle along the candidate of the route is predicted for each of the at least two candidates of the route. Further, based on the predicted fluctuation amount, the future value of the free space in the one or more memory devices at which the vehicle arrives at the destination of the candidate of the route is predicted for each of the at least two candidates of the route. Then, one candidate of the route from the at least two candidates of the route of which the future value of the free space is the maximum is selected as the route of the vehicle along which the autonomous driving control is executed (i.e., the autonomous driving route). Therefore, according to the present disclosure, it is possible to prevent the situation in which the free space of the memory device of the vehicle in which the autonomous driving control using machine learning models is executed is filled with log data related to the autonomous driving control.

DESCRIPTION OF EMBODIMENT

1. Autonomous Driving of Vehicle

Figure 1:
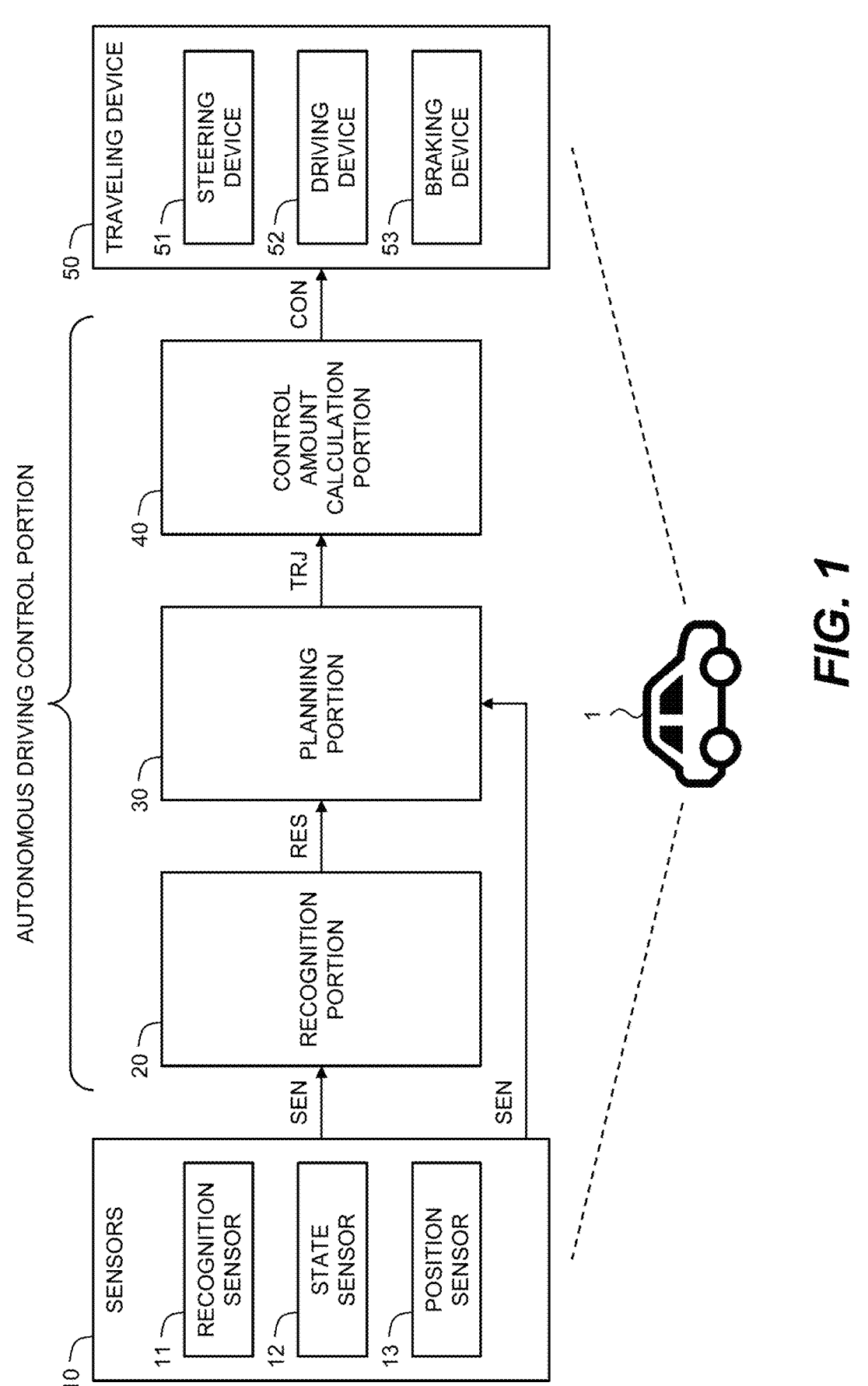
FIG. 1 is a block diagram illustrating an example of a configuration related to autonomous driving control of a vehicle according to an embodiment.

FIG. 1 is a block diagram illustrating a configuration example related to autonomous driving control of a vehicle 1 according to the present embodiment. The autonomous driving is to automatically execute at least one of steering, acceleration, and deceleration of the vehicle 1 without depending on a driving operation by an operator. The autonomous driving control is a concept including not only complete autonomous driving control but also risk avoidance control, lane keep assist control, and the like. The operator may be a driver riding in the vehicle 1 or a remote operator who remotely operates the vehicle 1.

The vehicle 1 includes sensors 10, a recognition portion 20, a planning portion 30, a control amount calculation portion 40, and a driving device 50.

The sensors 10 include a recognition sensor 11 used for recognizing a situation around the vehicle 1. Examples of the recognition sensor 11 include a camera, a laser imaging detection and ranging (LIDAR), and a radar. The sensors 10 may further include a state sensor 12 that detects a state of the vehicle 1, a position sensor 13 that detects a position of the vehicle 1, and the like. Examples of the state sensor 12 include a speed sensor, an acceleration sensor, a yaw rate sensor, and a steering angle sensor. Examples of the position sensor 13 include a global navigation satellite system (GNSS) sensor.

The information on sensor detection SEN is information obtained by the sensors 10. For example, the information on sensor detection SEN includes an image captured by the camera. As another example, the information on sensor detection SEN may include point group information obtained by the LIDAR. The information on sensor detection SEN may include vehicle status information indicating the status of the vehicle 1. The information on sensor detection SEN may include positional information indicating the position of the vehicle 1.

The recognition portion 20 receives information on sensor detection SEN. The recognition portion 20 recognizes the surrounding situation of the vehicle 1 based on the information obtained by the recognition sensor 11. For example, the recognition portion 20 recognizes an object around the vehicle 1. Examples of the object include a walker, other vehicles (e.g., a preceding vehicle, a parking vehicle, and the like), a white lane, road construction (e.g., a guard rail, a curb), a fallen object, a traffic light, an intersection, a mark, and the like. The information on recognition result RES indicates a recognition result by the recognition portion 20. For example, the information on recognition result RES includes object information indicating a relative position and a relative speed of the object with respect to the vehicle 1.

The planning portion 30 receives the information on recognition result RES from the recognition portion 20. In addition, the planning portion 30 may receive vehicle status information, positional information, and pre-generated map information. The map information may be high-precision three-dimensional map information. The planning portion 30 generates a driving plan of the vehicle 1 based on the received information. The driving plan may be the one to reach a destination set in advance or the one to avoid a risk. Examples of the driving plan include maintaining a current traveling lane, changing lanes, taking an overtake, turning right or left, steering, accelerating, decelerating, and stopping. Further, the planning portion 30 generates a target trajectory TRJ required for the vehicle 1 to travel in accordance with the driving plan. The target trajectory TRJ includes a target position and a target speed.

The control amount calculation portion 40 receives the target trajectory TRJ from the planning portion 30. The control amount calculation portion 40 calculates a control amount CON required for the vehicle 1 to follow the target trajectory TRJ. The control amount CON may be a control amount required to reduce a deviation between the vehicle 1 and the target trajectory TRJ. The control amount CON includes at least one of a steering control amount, a drive control amount, and a braking control amount. Examples of the steering control amount include a target steering angle, a target torque, a target motor angle, and a target motor drive current. Examples of the drive control amount include target speed, target acceleration, and the like. Examples of the braking control amount include target speed, target deceleration, and the like.

The driving device 50 includes a steering device 51, a driving device 52, and a braking device 53. The steering device 51 steers the wheels. For example, the steering device 51 includes an electric power steering (EPS) device. The driving device 52 is a power source that generates a driving force. Examples of the driving device 52 include an engine, an electric motor, and an in-wheel motor. The braking device 53 generates a braking force. The driving device 50 receives the control amount CON from the control amount calculation portion 40. The driving device 50 operates the steering device 51, the driving device 52, and the braking device 53 in accordance with the steering control amount, the drive control amount, and the braking control amount, respectively. As a result, the vehicle 1 travels so as to follow the target trajectory TRJ.

The recognition portion 20 may include at least one of rule-based models and machine learning models. The rule-based models execute recognition processing based on a predetermined rule group. Examples of the machine learning models include a neural network (NN), a support vector machine (SVM), a regression model, and a decision tree model. The NN may be a convolutional neural network (CNN), a recurrent neural network (RNN), or a combination thereof. The type of each layer, the number of layers, and the number of nodes in the NN are arbitrary. The machine learning models are generated in advance through machine learning. The recognition portion 20 executes recognition processing by inputting information on sensor detection (SEN) to the models. The information on recognition result RES is output from the models or generated based on the output from the models.

The planning portion 30 may also include at least one of rule-based models and machine learning models. The planning portion 30 executes planning processing by inputting the information on recognition result RES to the models. The target trajectory TRJ is output from the model or generated based on the output from the models.

The control amount calculation portion 40 also includes at least one of rule-based models and machine learning models. The control amount calculation portion 40 executes control amount calculation processing by inputting the target trajectory TRJ to the models. The control amount CON is output from the model or generated based on the output from the models.

Two or more of the recognition portions 20, the planning portion 30, and the control amount calculation portion 40 may be integrally configured. All of the recognition portion 20, the planning portion 30, and the control amount calculation portion 40 may be integrally configured (End-to-End configuration). For example, the recognition portion 20 and the planning portion 30 may be integrally configured by the NN that outputs the target trajectory TRJ from the information on sensor detection SEN. Even in the case of the integrated configuration, an intermediate product such as the information on recognition result RES or the target trajectory TRJ may be output. For example, when the recognition portion 20 and the planning portion 30 are integrally configured by the NN, the information on recognition result RES may be an output of an intermediate layer of the NN.

The recognition portion 20, the planning portion 30, and the control amount calculation portion 40 constitute an "autonomous driving control portion" that controls the autonomous driving of the vehicle 1. In the present embodiment, the machine learning models are used for at least a part of the autonomous driving control portion. That is, at least one of the recognition portion 20, the planning portion 30, and the control amount calculation portion 40 may include the machine learning models. The autonomous driving control portion executes at least a portion of the autonomous driving control of the vehicle 1 using the machine learning models.

2. Autonomous Driving System

Figure 2:
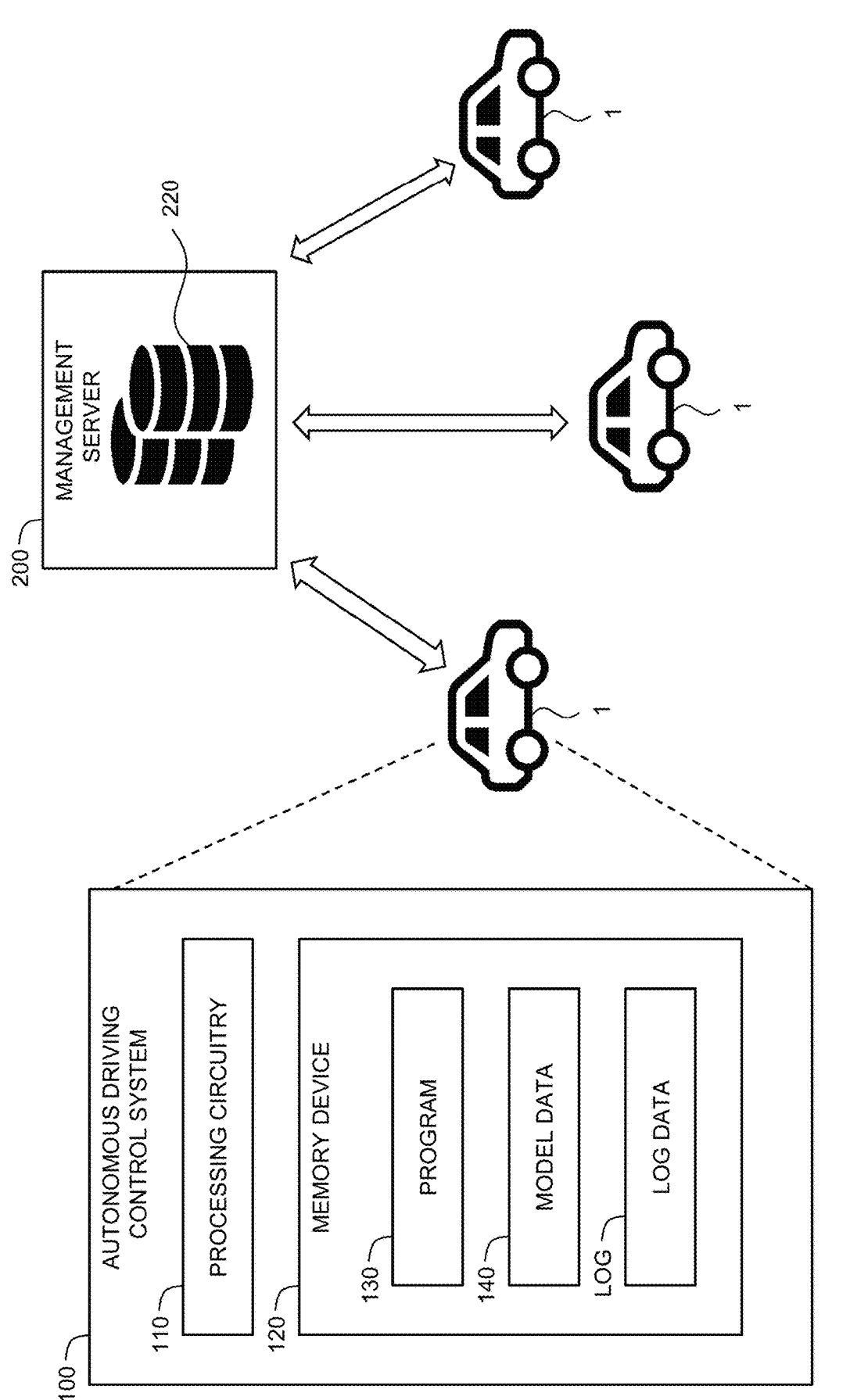
FIG. 2 is a conceptual diagram illustrating a configuration example of an autonomous driving system according to the embodiment.

FIG. 2 is a conceptual diagram illustrating a configuration example of the autonomous driving system 100 according to the present embodiment. The autonomous driving system 100 is mounted on the vehicle 1 and executes the autonomous driving control of the vehicle 1. The autonomous driving system 100 has at least the function of the autonomous driving control portion described above. The autonomous driving system 100 may further include the sensors 10 and the driving device 50.

The autonomous driving system 100 includes one or more processing circuitries 110 (hereinafter, simply referred to as a "processing circuitry" 110) and one or more memory devices 120 (hereinafter, simply referred to as a "memory device 120"). The processing circuitry 110 executes various processing. Examples of the processing circuitry 110 include a central processing unit (CPU), a graphics processing unit (GPU), an application specific integrated circuit (ASIC), and a field-programmable gate array (FPGA). The recognition portion 20, the planning portion 30, and the control amount calculation portion 40 may be implemented by a single processing circuitry 110 or may be implemented by separate processing circuitry 110. The memory device 120 stores various information. Examples of the memory device 120 include a hard disk drive (HDD), a solid-state drive (SSD), a volatile memory, and a nonvolatile memory.

The program 130 is a computer program for controlling the vehicle 1, and is executed by the processing circuitry 110. Various processes by the autonomous driving system 100 may be realized by cooperation of the processing circuitry 110 that executes the program 130 and the memory device 120. The program 130 is stored in the memory device 120. The program 130 may be recorded in a computer-readable recording medium.

The model data 140 is data of a model included in the recognition portion 20, the planning portion 30, and the control amount calculation portion 40. As described above, in the present embodiment, at least one of the recognition portion 20, the planning portion 30, and the control amount calculation portion 40 includes the "machine learning models". The model data 140 is stored in the memory device 120 and used for the autonomous driving control.

During the autonomous driving control, the processing circuitry 110 obtains "log data LOG" associated with the autonomous driving control. The log data LOG may include information on sensor detection SEN input to the autonomous driving control portion. The log data LOG may include a control amount CON output from the autonomous driving control portion. The log data LOG may include information on recognition result RES output from the recognition portion 20. The log data LOG may include the target trajectory TRJ output from the planning portion 30. The log data LOG may include a reason for determination in the recognition processing by the recognition portion 20. The log data LOG may include a reason for determination in the planning processing by the planning portion 30. The log data LOG may include the presence or absence of an operator intervention for the autonomous driving control.

The processing circuitry 110 stores the log data LOG acquired during the autonomous driving control in the memory device 120. The processing circuitry 110 may temporarily store the log data LOG in the memory device 120 for a certain period.

The management server 200 is an external device that exists outside the vehicle 1. The management server 200 includes a database 220. The management server 200 communicates with one or more vehicles 1 via a communication network. During the autonomous driving control or after the autonomous driving control is terminated, the processing circuitry 110 of the vehicle 1 may upload at least a part of the log data LOG stored in the local memory device 120 to the management server 200. The log data LOG uploaded to the management server 200 is used for verification of autonomous driving control using machine learning models. The processing circuitry 110 may delete the log data LOG uploaded to the management server 200 from the local memory device 120.

3. Autonomous Driving Route

In the present embodiment, a case is considered where the autonomous driving control of the vehicle 1 is executed in a section where autonomous driving is possible (e.g., a section of an expressway, a section dedicated to an autonomous driving, or the like). In this case, a route of the vehicle 1 on which the autonomous driving control is executed (hereinafter, also referred to as an "autonomous driving route") is set. Setting processing of the autonomous driving route (hereinafter, also referred to as "route setting processing") may be executed by the processing circuitry 110 or may be executed by a processing circuitry (e.g., a processing circuitry of a navigation system) other than the processing circuitry 110 mounted on the vehicle 1.

While the vehicle 1 is traveling along the autonomous driving route, the log data LOG is generated in accordance with the execution of the autonomous driving control. The generated log data LOG is stored in the memory device 120 of the vehicle 1. Here, during the execution of the autonomous driving control, the log data LOG continues to be generated. Therefore, a total quantity Qlog of the log data LOG in the memory device 120 continues to increase, while a free space QC of the memory device 120 continues to decrease. As a result, when the free space QC is tight, there is a possibility that the log data LOG generated during the traveling of the vehicle 1 along the autonomous driving route cannot be stored from the middle of the autonomous driving route.

3-1. First Example of Route Setting Processing

Figure 3:
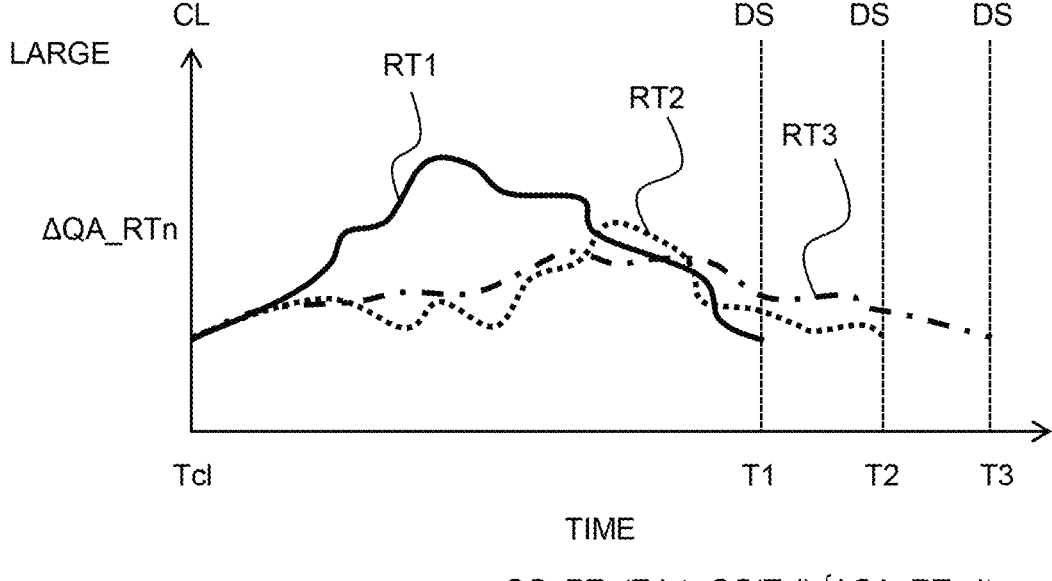
FIG. 3 is a diagram illustrating an example of an instruction related to a management of log data.

In view of this problem, in the route setting processing, at least two candidate RTs n of the autonomous driving route are set (n>2). In the route setting processing, the total quantity QA_RTn of the log data LOG generated during the traveling of the vehicle 1 along the candidate RTn is predicted. FIG. 3 is a diagram for explaining the total quantity QA_RTn. In FIG. 3, candidates RT1, RT2, and RT3 are drawn as the candidates RTn of the route. These candidates are all candidates of three routes from a current location CL of the vehicle 1 to a destination DS of the vehicle 1. The time Tcl shown on the horizontal axis of FIG. 3 represents the current time. Further, times T1, T2, and T3 represent the times at which vehicle 1 arrives at destination DS when the vehicle 1 travels along the candidates RT1, RT2, and RT3, respectively.

The vertical axis of FIG. 3 represents a generated quantity per unit time ΔQA_RTn of the log data LOG. As shown in FIG. 3, the generated quantity ΔQA_RTn differs among the candidates RT1 to RT3. This is because at least a part of the routes is different among the candidates RT1 to RT3. This is because, if at least a part of the routes is different, a difference occurs in a frequency or a difficulty of an event (e.g., a recognition event of an object, a generation event of a driving plan, a calculation event of a control amount, or the like) in which the log data LOG is generated. In general, the higher the frequency of events per unit time, the larger the generated quantity ΔQA-RTn. Further, the higher the difficulty level of the event, the more the generated quantity ΔQA_RTn.

The total quantity QA_RT1 of the log data LOG generated during the travel of the vehicle 1 along the candidate RT1 is represented by the value $\int \Delta QA\_t1 dt$ obtained by integrating the generated quantity ΔQA_RT1 from the time Tcl to the time RT1. The total quantity QA_RT2 is represented by a value $\int \Delta QA\_t2 dt$ obtained by integrating the generated quantity ΔQA_RT2 from the time Tcl to the time RT2. The total quantity QA_RT3 is represented by a value $\int \Delta QA\_t3 dt$ obtained by integrating the generated quantity ΔQA_RT3 from the time Tcl to the time RT3.

In the route setting processing, further, the future value QC_RTn (Tds) of the free space QC at the time of an arrival at the destination DS (an arrival time Tds) is calculated based on the total quantity QA_RTn. The future value QC_RTn (Tds) can be expressed by the following Equation (1) using the value of the free space QC at the time Tcl (i.e., the current value) QC (Tcl).

$$QC\_RTn\,(Tds) = QC\,(Tcl) - \int \Delta QA\_RTn dt \qquad (1)$$

In the first example of the route setting processing, the candidate RTn that maximizes the future value QC_RTn (Tds) calculated by Equation (1) is selected as the autonomous driving route. If the candidate RTn of which the future value QC_RTn (Tds) is the maximum, it is possible to avoid a situation where the free space QC is congested on the way to the destination DS. In the example of FIG. 3, the total quantity QA_RT2 is the minimum. Therefore, the candidate RTn having the maximum future value QC_RTn (Tds) calculated by Equation (1) is the candidate RT2, and this is selected as the autonomous driving route.

3-2. Second Example of Route Setting Processing

In the example of calculating the future value QC_RTn (Tds) described with reference to FIG. 3, the fluctuation amount of the log data LOG in the memory device 120, which fluctuates during the travel along the candidate RTn, is represented by the total quantity QA_RTn. However, if a communication spot (e.g., a charging or refueling spot, a service area on the expressway, etc.) is included on the candidate RTn or in the vicinity of the candidate RTn, the log data LOG may be transmitted to the management server 200 on the way to the destination DS. In this case, the transmitted log data LOG can be compressed and stored in the memory device 120, or the transmitted log data LOG can be deleted from the memory device 120.

Figure 4:
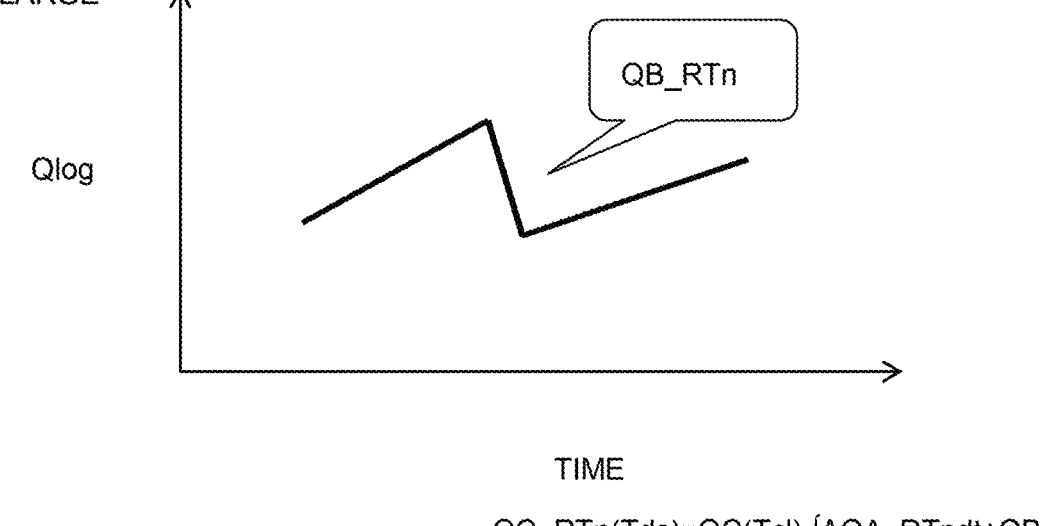
FIG. 4 is a diagram for explaining a storage time for extracting and storing the log data.

FIG. 4 is a diagram showing an example of a transition of the total quantity Qlog of the log data LOG in the memory device 120 when the transmitted log data LOG is compressed or deleted. In the example shown in FIG. 4, log data LOG is transmitted to the management server 200 during the travel along the candidate RTn. The transmitted log data LOG is compressed and stored in the memory device 120. As a result, the total quantity Qlog is decreased by the data quantity QB_RTn, while the free space QC of the memory device 120 is increased. Therefore, when the communication spot is included on the candidate RTn or in the vicinity of the candidate RTn, the future value QC_RTn (Tds) can be expressed by the following Equation (2).

$$QC\_RTn\,(Tds) = QC\,(Tcl) - \int \Delta QA\_RTn dt + QB\_RTn \qquad (2)$$

In the second example of the route setting processing, the candidate RTn having the maximum future value QC_RTn (Tds) calculated by Equation (2) is selected as the autonomous driving route. In this way, the fluctuation amount of the log data LOG in the memory device 120, which fluctuates during the travel along the candidate RTn, can be expressed by a combination of the total quantity QA_RTn and the data quantity QB_RTn.

As described above, according to the first or second example, the candidate RTn having the maximum future value QC_RTn (Tds) is selected as the autonomous driving route. Therefore, it is possible to avoid a situation in which the free space QC is tight during the traveling of the vehicle 1 along the autonomous driving route.

4. Processing Example by Processing Circuitry

Figure 5:
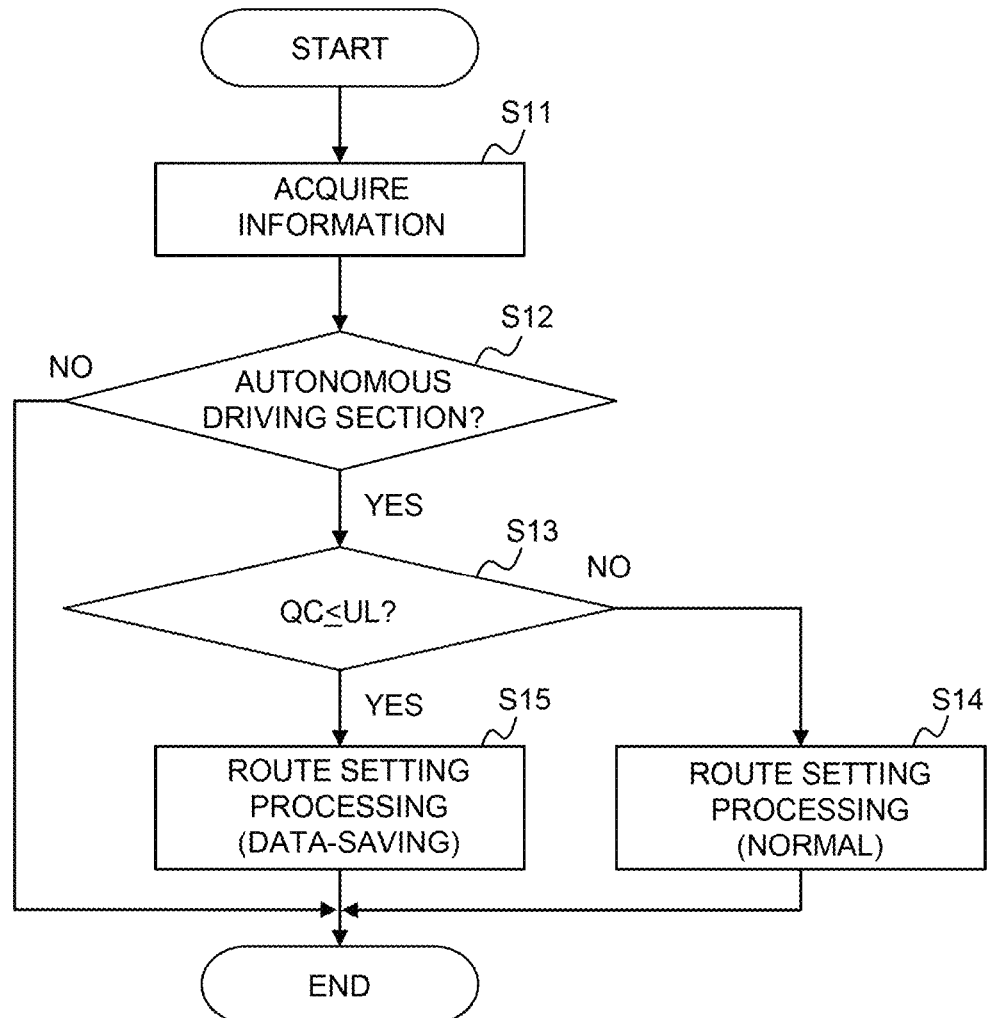
FIG. 5 is a flow chart illustrating a processing flow executed by a processing circuitry, particularly in relation the embodiment.

FIG. 5 is a flow diagram illustrating a processing flow executed by the processing circuitry 110, particularly related to the present embodiment. The routine shown in FIG. 5 is repeatedly executed at a predetermined control cycle.

In the routine shown in FIG. 5, first, various kinds of information are acquired (step S11). Examples of the information acquired in the processing of step S11 include information of the actual position of the vehicle 1 (latitude and longitude information), map information, and information of the free space QC of the memory device 120.

Subsequent to the processing of step S11, it is determined whether the vehicle 1 is located in a section where the autonomous driving is permitted (step S12). The determination in step S12 is executed based on, for example, the information of the actual position of the vehicle 1 acquired in step S11 and the map information. When the judgment result in step S12 is negative, it can be determined that autonomous driving control is not executed. Therefore, in this case, the process is terminated.

If the judgment result in step S12 is positive, it can be determined that the autonomous driving control is executed. Therefore, it is determined whether the current value QC (Tcl) of the free space QC of the memory device 120 is equal to or less than an upper limit value UL (step S13). In the processing of step S13, the value of the free space QC acquired in step S11 is used as the current value QC (Tcl). The upper limit value UL is preset, for example, as an average amount of log data LOG that occurs during one trip. The average amount of log data LOG may be an average amount for one or more vehicles 1 or an average amount for the vehicle 1 in which the processing circuitry 110 is mounted.

If the judgment result in step S13 is negative, the route setting processing (normal) is executed (step S14). In the processing of step S14, the autonomous driving route from the current location C L to the destination DS of the vehicle 1 is set based on aspects other than the log data LOG. As the aspects other than log data LOG, a time required to reach the destination DS, a driving distance, fees, and the like are exemplified.

If the judgment result in step S13 is positive, the route setting processing (data-saving) is executed (step S15). In the processing of step S15, the candidate RTn is set by the first or second example described above, and the total quantity QA_RTn of the log data LOG generated during the travel of the vehicle 1 along the candidate RTn (see the first and second examples) and the data quantity QB_RTn of the log data LOG decreased during the travel of the vehicle 1 along the candidate RTn (see the second example) are predicted. Then, the candidate RTn having the maximum future value QC_RTn (Tds) calculated based on Equation (1) or (2) is selected as the autonomous driving route.

In some embodiments, the processing in step S13 is omitted. Therefore, when the judgment result in step S12 is positive, the process in step S13 may be skipped and the process in step S15 may be executed. In the processing of step S15, before calculating the future value QC_RTn (Tds), a midway value QA_RTn (Tmw) of the log data LOG generated during the travel of the vehicle 1 along the candidate RTn may be calculated. Further, the candidate RTn may be narrowed down based on the midway value QA_RTn (Tmw).

Figure 6:
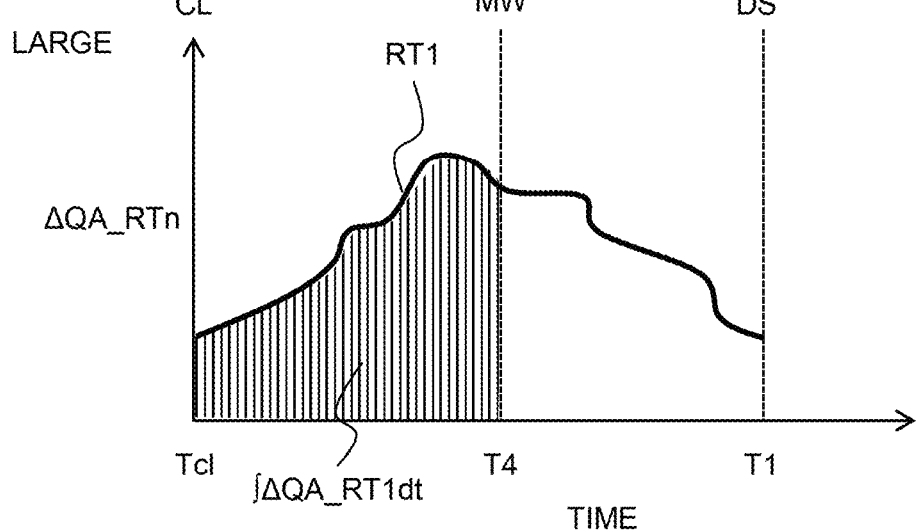
FIG. 6 is a flowchart illustrating a processing flow executed by the processing circuitry, particularly in relation to the embodiment.

FIG. 6 is a diagram for explaining the midway value QA_RTn (Tmw). FIG. 6 illustrates the candidate RT1 described in FIG. 3. As described in the description of FIG. 3, the total quantity QA_RT1 of the log data LOG generated during the travel of the vehicle 1 along the candidate RT1 is the value $\int \Delta QA\_t1 dt$ obtained by integrating the generated quantity $\Delta QA\_RT1$ from the time Tcl to the time RT1. The midway value QA_RTn (Tmw) is a total quantity of the log data LOG generated by a time (time t4 in the example of FIG. 6) before the vehicle 1 reaches the destination DS.

When the midway value QA_RTn (Tmw) is calculated in the processing of step S15, the value of the free space QC at a time Tmw (i.e., the midway value) may be calculated based on the midway value QA_RTn (Tmw). The midway value QC_RTn (Tmw) in this case can be expressed by the following Equation (3).

$$QC\_RTn\,(Tmw) = QC\,(Tcl) - QA\_RTn\,(Tmw) \qquad (3)$$

When the midway value QC_RTn (Tmw) is calculated, the midway value QC_RTn (Tmw) may be further compared with an allowable value AC. The allowable value AC is set to, for example, zero or a value close to zero. As a result of the comparison, when there is a candidate RTn whose midway value QC_RTn (Tmw) is equal to or less than the allowable value AC, the candidate RTn is excluded from the candidates of the autonomous driving route. Such a candidate RTn may be considered to be in a situation where the free space QC is congested on the way to the destination DS. Therefore, according to the example of narrowing down the candidate RTn based on the midway value QA_RTn (Tmw), it is possible to achieve more reliably the effect of the present embodiment of avoiding a situation in which the free space QC is tight.

What is claimed is:

1. An autonomous driving system mounted on a vehicle, comprising:
one or more processing circuitries; and
one or more memory devices,
wherein the one or more processing circuitries are configured to:
set an autonomous driving route indicating a route of the vehicle on which autonomous driving control of the vehicle is executed; and
store log data related to the autonomous driving control in the one or more memory devices while the vehicle is traveling along the autonomous driving route,
wherein, in the setting of the autonomous driving route, the one or more processing circuitries are configured to:
set at least two candidates for a route from a current location of the vehicle to a destination of the vehicle;
predict for each of the at least two candidates of the route a fluctuation amount of the log data that fluctuates in the one or more memory devices during the travel of the vehicle along the candidate of the route;
predict a future value of a free space in the one or more memory devices at which the vehicle arrives at a destination of the candidate of the route for each of the at least two candidates of the route based on the fluctuation amount of the log data predicted for each of the at least two candidates of the route;
select as the autonomous driving route one candidate of the route from the at least two candidates of the route of which the future value of the free space is the maximum; and
perform autonomous driving control of the vehicle based on the selected autonomous driving route.

2. The autonomous driving system according to claim 1, wherein, in the setting of the autonomous driving route, the one or more processing circuitries are configured to determine whether a current value of the free space is equal to or less than an upper limit value,
wherein the prediction of the fluctuation amount of the log data and the prediction of the future value of the free space are executed when it is determined that the current value of the free space is equal to or less than the upper limit value.

3. The autonomous driving system according to claim 1, wherein, in the prediction of the fluctuation amount of the log data, the one or more processing circuitries are configured to:
calculate, for each of the at least two candidates of the route, a total quantity of the log data which is generated during the travel of the vehicle along the candidate of the route and a data quantity of the log data in the one or more memory devices which is decreased during the travel of the vehicle; and
calculate, for each of the at least two candidates of the route, the fluctuation of the log data by adding the total quantity of the log data generated during the travel of the vehicle and the data quantity of the log data decreased in the one or more memory devices during the travel of the vehicle.

4. The autonomous driving system according to claim 1, wherein, in the setting of the autonomous driving route, the one or more processing circuitries are further configured to:
calculate, for each of the at least two candidates of the route, a generate quantity per unit time of the log data which is generated during the travel of the vehicle along the candidate of the route;

predict, for each of the at least two candidates of the route, a midway value indicating a value of the free space on the way to the destination of the vehicle based on a current value of the free space and an integrated value of the generated quantity per unit time; and exclude, from the at least two candidates of the route, a candidate of the route of which the midway value is equal to or less than an allowable value.

* * * * *